United States Patent
Nitz et al.

(10) Patent No.: US 9,329,092 B2
(45) Date of Patent: May 3, 2016

(54) METHOD FOR DETERMINING A TORQUE AND AN INDUSTRIAL ROBOT

(71) Applicant: KUKA Roboter GmbH, Augsburg (DE)

(72) Inventors: Gernot Nitz, Augsburg (DE); Michael Thummel, Augsburg (DE)

(73) Assignee: KUKA Roboter GmbH, Augsburg (DE)

( * ) Notice: Subject to any disclaimer, the term of this patent is extended or adjusted under 35 U.S.C. 154(b) by 490 days.

(21) Appl. No.: 13/759,795

(22) Filed: Feb. 5, 2013

(65) Prior Publication Data

US 2013/0211739 A1     Aug. 15, 2013

(30) Foreign Application Priority Data

Feb. 14, 2012 (DE) .......................... 10 2012 202 181

(51) Int. Cl.
    *G01L 3/02*          (2006.01)
    *B25J 9/16*          (2006.01)

(52) U.S. Cl.
    CPC ................. *G01L 3/02* (2013.01); *B25J 9/1633* (2013.01); *G05B 2219/39061* (2013.01); *G05B 2219/39261* (2013.01)

(58) Field of Classification Search
    CPC ............... G01L 3/02; G01L 3/00; G01L 3/04; G05B 2219/39; G05B 2219/39001–2219/39003; G05B 2219/39061; G05B 2219/39261; B25J 9/1633; B25J 9/1635
See application file for complete search history.

(56) References Cited

U.S. PATENT DOCUMENTS

| | | | |
|---|---|---|---|
| 6,226,565 | B1 | 5/2001 | Elfving et al. |
| 2008/0258670 | A1 | 10/2008 | Yoshikawa |
| 2010/0324733 | A1 | 12/2010 | Bischoff et al. |

FOREIGN PATENT DOCUMENTS

| | | |
|---|---|---|
| CN | 1180423 A | 4/1998 |
| CN | 1683123 A | 10/2005 |
| CN | 1771114 A | 5/2006 |
| DE | 102007063099 A1 | 7/2009 |
| JP | 2007136564 A | 6/2007 |
| JP | 2010 269412 A | 12/2010 |

OTHER PUBLICATIONS

Kostin et al., Modeling of Dynamics of Industrial Robots with Flexible Electric Drives, 1997 IEEE, pp. 275-278.*
German Patent Office; Search Report in German Patent Application No. 10 2012 202 181.7 dated Sep. 20, 2012; 5 pages.
Chinese Patent Office; Search Report in Chinese Patent Application No. 201210440283.2 dated Oct. 25, 2014; 2 pages.
Chinese Patent Office; Office Action in Chinese Patent Application No. 201210440283.2 dated Nov. 3, 2014; 8 pages.

* cited by examiner

*Primary Examiner* — Toan Le
(74) *Attorney, Agent, or Firm* — Wood, Herron & Evans, LLP

(57) ABSTRACT

The invention concerns an industrial robot and a method to determine a torque having an effect on a limb of the robotic arm. The robotic arm has several sequentially arranged limbs, of which a first limb is stored relative to a second limb of the limbs on an axis of rotation, and using a stationary motor relative to the second limb and a gearbox connected to the motor, is rotatable around the axis of rotation.

9 Claims, 2 Drawing Sheets

METHOD FOR DETERMINING A TORQUE AND AN INDUSTRIAL ROBOT

TECHNICAL FIELD

The invention concerns a method for determining a torque and an industrial robot.

BACKGROUND

Robots are work machines that are set up for automatic handling and/or processing of objects with tools and that are programmable on several movement axes, such as regarding orientation, position, and course of work. Robots normally have a robotic arm with several programmable controls (control devices) over limbs connected by joints, which control and adjust the movements of the robot during operation. The limbs are normally moved by electric motors with gears that are controlled by the control device, in particular over the movement axes.

DE 10 2007 063 099 A1 shows a robot with several limbs rotatable relative to each other over several rotating axes. In order to determine the moments exerted on the rotating axes, the robot includes suitable torque sensors, which for example include strips for measuring stretching, whose resistance in ohms changes upon rotation or compression of the strip for measuring stretching. The individual sensors may have several strips for measuring extension, which for example are connected as semi- or full bridges.

SUMMARY

The task of the invention is to provide an improved determination of a torque affecting a limb of the robotic arm.

The task of the invention is solved by a method for determining the torque having an effect on a limb of a robotic arm, whereby the robotic arm has several sequentially arranged limbs, of which a first limb is supported to be rotatable relative to a second limb of the limbs on an axis of rotation, and is rotatable around the axis of rotation using a stationary motor relative to the second limb that is then connected to a gearbox, and has the following method steps:

Determination of the angle of rotation on the driving side gear facing the motor and of the angle of rotation on the reducing side gear away from the motor, and Determination of the torque affecting the first limb based on the determined driving side and reducing side gear angle of rotation and based on a mathematical model of the gearbox, which considers in particular the elastic properties of the gearbox.

Another aspect of the invention involves an industrial robot, having

A robotic arm that has several sequentially arranged limbs, of which a first limb is supported relative to a second limb connected to an axis of rotation, and using a stationary motor relative to the second limb that is then connected to a gearbox, is rotatable around the axis of rotation.

A first angle measurement device, which is set up to determine the angle of rotation of the gearbox on the driving side turned toward the motor, A second angle measurement device, which is set up to determine the angle of rotation of the gearbox on the reducing side away from the motor, and A control device connected with the two measuring devices, which is set up to control the motor during operation of the industrial robot, in which a mathematical model of the gearbox is stored, which takes into account in particular the elastic properties of the gearbox, and which is set up to determine, based on the mathematical model, the torque affecting the first limb determined on the driving side and reducing side angles of rotation of the gearbox.

The industrial robot according to the invention is thereby set up to perform the method according to the invention. In particular, the control device is set up to determine the torque affecting the first limb by the method according to the invention.

Hereby the robotic arm has several sequentially arranged limbs, and which are movable relative to each other, in particular through gears that preferentially are set up as electric gear drives. For example, the gears include motors and the performance electronics to drive the motors. The gears are in particular adjustable gears, preferentially electrically adjustable gears.

The robotic arm is set up in a way that the first limb is rotatably supported around the axis of rotation and relative to the second limb; it is rotatable around the axis of rotation through the stationary motor relative to the second limb and through the gearbox then connected to the motor. In the operation of the robotic arm or of the industrial robot, a torque may have an effect on the first limb, with the torque being relative to a reducing moment or a reducing side torque of the gearbox. According to the invention, this torque is not determined directly, say by a torque sensor, but indirectly through the determination of the driving side and reducing side angle of rotation of the gearbox and through the mathematical model of the gearbox. That is to say, the torque has an effect on the first limb, and this has an effect on the gears. If the gear properties are known, then the mathematical model can be created, which provides a connection between the driving side and reducing side angles of rotation and the torque. The gear properties can for example be determined empirically or taken from the data sheets of the gears.

The mathematical model is for example stored in a computer, to which the signals set on the angles of rotation are sent. The computer is configured in such a way that it calculates the torque on the basis of the determined angles of rotation and on the basis of the mathematical model. Preferentially this computer is part of the control device of the industrial robot according to the invention, for which it is also envisaged that the movement of the robotic arm can be controlled and if needed adjusted in a generally known manner. The mathematical model may be stored on the control device, so that as a result this is also set up to determine the torque.

The gears may preferentially have a driving side shaft connected to the motor, a reducing side shaft connected at least indirectly to the first limb, and a gearbox member set up for at least one of the two shafts for the transmission of the gears. The at least one gearbox unit includes for example cog wheels, such as are known in principle to the person skilled in the art. In this case preferentially the driving side angle of rotation is the angle of rotation of the driving side shaft, and the reducing side angle of rotation is the angle of rotation of the reducing side shaft. These can be determined with the corresponding angle measuring devices.

Determining the driving side angle of rotation can be performed preferentially through determining the angle of rotation of the motor, in particular of its shaft. Here it is a matter of part of an adjusted gear for the motor, and therefore the motor is also provided for this purpose with an angle measuring device, for example in the form of a rotation gauge.

The torque having an effect on the first limb is preferentially calculated by the following equation:

$$\Sigma(t) = f(\varphi_B - \varphi_A)$$

whereby τ is the torque having an effect on the first limb and the function $f(\phi_B-\phi_A)$ is stored as the mathematical model.

In particular the elastic properties of the gearbox are considered for the mathematical model. These elastic properties include in particular a hysteresis, which depends in particular on the rotating direction of the gearbox. This hysteresis, which is a function of the direction of rotation, arises for example through the cog wheels of the gearbox, in particular through of at least one unit of the gearbox. The mathematical model carried out as a hysteresis model sets up a connection between the course over time of the torque and the deformation of the gearbox, and can for example be determined by the equation $$\tau(t)=f(\phi_B-\phi_A).$$

For a more exact mathematical model, according to one variant, transmission errors can be considered in the mathematical model of at least one of the gearbox units. Physical gearboxes may show, in addition to elasticity, kinematic errors and transmission errors, which can be considered in the mathematical model of the gearbox for an improved determination of the torque affecting the first limb.

In order to better assess the torque affecting the first limb, if this motor is an electric motor, the electrical current of the electrical motor can be determined. The electrical current of the motor is a measure of the torque exerted by the motor.

In order to determine a more exact torque affecting the first limb, a modification may be provided, at least indirectly, of the determined torque affecting the first limb based on the determined driving side and reducing side angles of rotation of the gearbox and based on the mathematical model of the gearbox, in turn based on the determined electrical current.

The at least indirect modification of the determined torque can for example be realized in that another torque is determined on the basis of the determined electrical current and a model of the electrical motor, and the torque and the additional torque are merged in order to attain a resulting torque having an effect on the first member. In this way the individually determined torques are merged or combined in order to obtain the more exactly determined resulting torque.

The at least indirect modification of the determined torque can for example also be realized in that the electrical current is used to support the mathematical model. On the basis of the electrical current, a support of the mathematical model can be achieved, in particular that of the part of the mathematical model modeling the hysteresis of the gearbox through the values of the electrical current of the motor. A hysteresis model thus usually works with connecting characteristics, which for example approximate the friction behavior of the gearbox. The electrical current of the motor also indirectly captures the friction behavior. This can be used in that some occurrences of the hysteresis model can be implemented on the basis of the electrical current in the sense of a "referencing to the electrical current".

Depending on the embodiment of the method according to the invention or of the industrial robot according to the invention, a setting of the reducing side moment of the joints of the robot may already be set by measurement of the distortion of the gearbox. In this way, for example, the sensor of the torque then connected to the gearbox is eliminated, whereby it is made possible to make the industrial robot according to the invention more rigid and more robust.

Since according to the invention the reducing side angle of rotation is recorded, in addition to determining the torque the possibility is given to monitor the limbs that are connected to the joint for defects in the gearbox, such as for cogwheel breakage and cogwheels coming off the track. In addition, the exactness of the industrial robot according to the invention can be significantly improved by balancing the deformations of the gears and the play in the gearbox.

According to the invention and depending on the embodiment, in addition to the gauges of rotation that generally exist on the motors of a robot, in particular highly exact angle sensors can be attached to the reducing side of the gearbox. In this way it is made possible to measure the deformation of the gears.

Robot gears in general have a lot of play, and their deformation as a function of the load is normally not linear, but is subject to hysteresis; their transmission behavior at times is not complete. Therefore it may occur according to the embodiment that in addition to the deformation of the gears, other physical measurements are recorded for the mathematical model of the gears in order to make a sufficiently exact statement about the torque on the reducing gears. This includes, for example, knowledge as to whether the deformation is increasing or decreasing, what is the setting of the gearbox and the related actual transmission error of the torque, what are the RPM of the motor, and/or what is the motor current. These measurements if applicable belong in the calculation of a model, which then preferentially results in the value of the reducing torque in real time.

BRIEF DESCRIPTION OF DRAWINGS

An example of an embodiment of the invention is presented for example purposes in the attached schematic drawings. They show.

DETAILED DESCRIPTION

Figure 1:
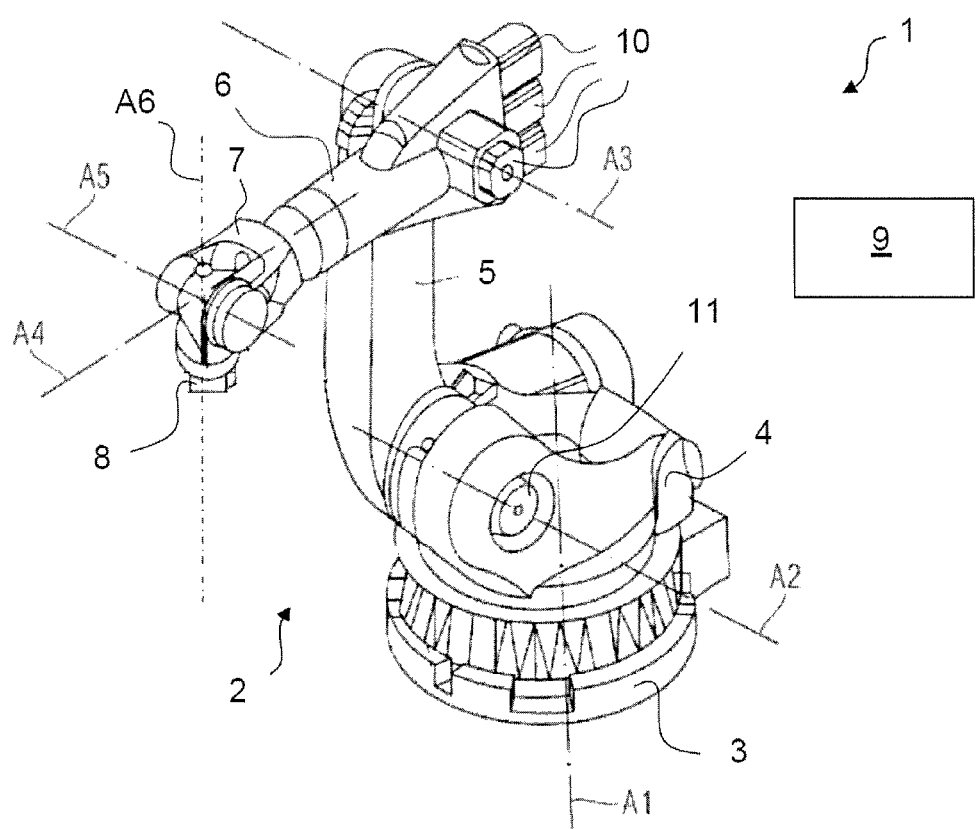
FIG. 1 a robot with a robotic arm and a control device.

FIG. 1 shows a robot 1 with a robotic arm 2 in perspective.

The robotic arm 2 in the case of the present example of an embodiment includes several sequentially arranged limbs connected by joints. The limbs involve in particular a stationary or movable chassis 3 and an axis A1 running vertical to the chassis 3, with the axis rotatable around the supported carousel 4. Other limbs of the robotic arm 2 are in the case of the present example of an embodiment of a rocker 5, an extension arm 6, and a robotic hand 7, preferentially with several axes and with a fastening device set up as a flange 8 for fastening a terminal actor not illustrated in detail. The rocker 5 is supported at the lower end of a swinging bearing head, not illustrated in detail, for example on the carousel 4, and is rotatably supported around a preferentially horizontal axis of rotation A2. At the upper end of the rocker 5, again the extension arm 6 is a stored rotatable around a preferentially horizontal axis A3. This item supports on its end a robotic hand 7 with its preferentially three rotating axes A4, A5, A6.

In order to move the robot 1 or its robotic arm 2, gears are connected in a generally known manner with a control device 9, which in particular are electric gears. In FIG. 1, only some of the gears of the electric motors 10, 11 are shown. A calculation program runs on the control device 9, by which the control device 9 during the operation of the robot 1 controls it in a way that the flange 8 or what is called a tool center point performs a pre-defined movement. If applicable, the control device 9 adjusts the gears, as is known in principle to the person skilled in the art. If necessary, the gears adjusted by the electric gears and the control device 9 create command signals for the adjusted gears.

Figure 2:
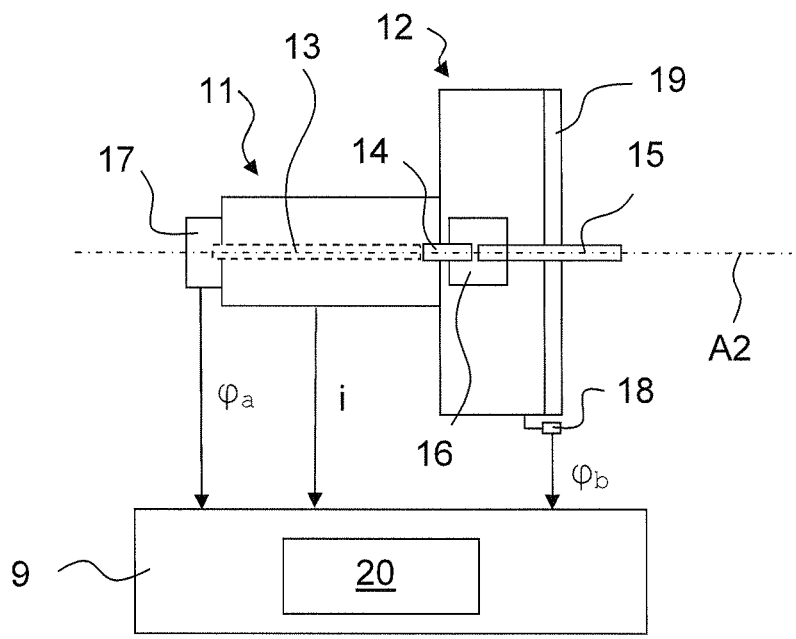
FIG. 2 an electric motor with gears for moving one of the limbs of the robotic arm relative to another limb of the robotic arm, and FIG. 3 a hysteresis curve.

In the case of the present embodiment, the particular motors 10, 11 are each stored behind a gearbox 12. This is shown in FIG. 2 on the example of the motor 11, so designed that the rocker 5 is to rotate around the axis of rotation A2 relative to the carousel 4. Thereby the motor 11 or its stator are connected without moving with the carousel 4 and move the rocker 5 by its shaft 13 and to the gearbox 12 with relation to the axis of rotation A2.

The gearbox 12 includes in the case of this embodiment a driving side shaft 14 connected with the shaft 13 of the motor 11, a reducing side shaft 15 connected with the rocker 5, and at least one gearbox unit 16, by means of which the driving side and reducing side shafts 14, 15 of the gearbox 12 are connected; this realizes a transmission of the gearbox 12 in a way generally known to the person skilled in the art. The gearbox unit 16 includes for example at least one cogwheel, as is known in principle to the person skilled in the art.

In the operation of the robot 1 as intended, the shaft 13 of the motor 11 drives the driving side shaft 14 of the gearbox 12 forward. In rotating the shaft 13 of the motor 11 around an angle of rotation $\phi_A$, it rotates at least the end of the driving side shaft 14 of the gearbox 12 oriented to the motor 11 and around an angle $\phi_A$; if the gearbox 12*a* should theoretically be an ideal gearbox, the reducing side shaft 15 of the gearbox 12 is rotated around an angle of rotation n*$\phi_A$, where "n" is the gear ratio of the gearbox 12.

On the basis of the elasticities of the gearbox 12, in particular of the shafts 14, 15 and/or of the gearbox unit 16 of the gearbox 12, but also on the basis of other influences, such as kinematic errors or transmission errors of the gearbox 12, in particular a torque of shafts 14, 15 of the gearbox 12 or torsion-like effects of the gearbox unit 16 occur in the operation of the robot 1, especially if the rocker 5 is set on the carousel 4 with a torque $D_M$. On the basis of these effects, the actual reducing side angle of rotation $\phi_B$ is distinguished from the theoretical angle, in that the reducing side shaft 14 of the gearbox 12 with its side turned toward the rocker 5 rotates around the axis of rotation A2, as opposed to the theoretically expected reducing side angle of rotation when using an ideal gearbox. The torque is therefore set up as a rotating angle of the gearbox 12

$$\Delta\phi = \phi_B - \phi_A.$$

In the case of this embodiment, an angle measuring device for example in the form of a rotation gauge 17 is set up for the motor 11 in a way to determine the torque $\phi_A$ of the shaft 13 of the motor 11 and with this the torque of the drive side shaft 14 of the gearbox 12. The rotation gauge 17 is for example integrated into the motor 11 and is in particular connected with the control device 9 in order to transmit to it a signal, which is to transmit an item of information via the angle of rotation $\phi_A$ of the shaft 13 of the motor 11.

In the case of the present embodiment, the robot 1 has another angle measuring device, for example in the form of a measuring head 18, which is set up to determine the reducing side angle of rotation $\phi_B$ of the reducing side shaft 15 of the gearbox 12. The measuring head 18 works together for example with a measuring body 19 on the housing of the gearbox 12, and is connected in particular with the control device 9 in order to send it a signal, which is to transmit an item of information via the angle of rotation $\phi_B$ of the reducing side shaft 14 of the gearbox 12.

In the case of the present embodiment, a mathematical model 20 of the gearbox 12 is stored in the control device 9, which in particular models the elasticity, if necessary even in the case of a kinematic error or a transmission error of the gearbox 12. The mathematical model 20 is set up in such a way that on the basis of the determined angle of rotation $\phi_A$, $\phi_B$, that is, of the angle of rotation $\phi_A$ of the shaft 13 of the motor 11 and of the angle of rotation $\phi_B$ of the reducing side shaft 15 of the gearbox 12, it is possible for the control device 9 using an appropriate calculation program to determine or to calculate the torque $\tau$ having an effect on the rocker 5.

Figure 3:
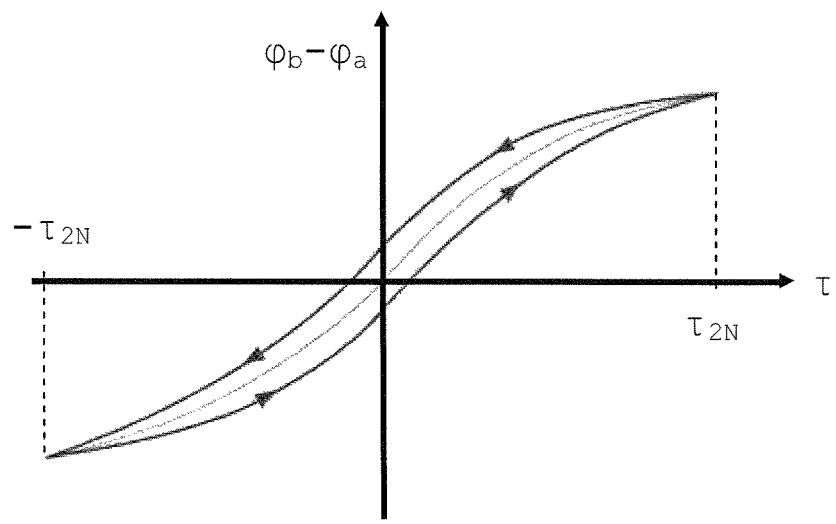

In the case of this embodiment, the mathematical model 20 of the gearbox 12 is set up in such a way that it takes into consideration a hysteresis corresponding to the direction of rotation of the gearbox 12, in particular of its gearbox unit 16. This is shown in FIG. 3, where $\tau_{2N}$ is a nominal value of the gearbox 12. A pure hysteresis model presents a connection between the movement of the torque $\tau$ over time and the distortion of the gearbox 12, in particular of its gearbox unit 16, so that the following is in effect:

$$\tau(t) = f(\phi_B - \phi_A).$$

In the case of this embodiment, both kinematic errors and transmission errors of the gearbox 12 are considered for the mathematical model 20 of the gearbox 12, which may incorrectly give an expected connection between the angles of torque $\phi_A$, $\phi_B$ if independent of the hysteresis and of the elasticities of the gearbox 12.

In the case of this embodiment, the electrical current i feeding the motor 11 may also be used for determining the moment of distortion having an effect on the rocker 5. Information about the electrical current i of the motor 11 is also guided to the control device 9. As is generally known to the person skilled in the art, a connection exists between the electrical current i of the motor 11 and the related, applied torque of the motor 11.

In the case of this embodiment, it is planned that the control device 9, based on the determined electrical current of the electrical current i of the motor 11, will further improve the quality of the calculated reducing moment, that is of the torque having an effect on the rocker 5. This can occur for example in the following manner in the case of this embodiment:

The torque (reducing moment) having an effect on the rocker 5 is also determined by the mathematical model 20 of the gearbox 12 and by means of the electrical current i of the motor 11. For this, for example, a mathematical model of the motor 11 stored in the control device 9 is used. Then the determined reducing moments are merged or combined, in particular corresponding to their qualities for increasing the exactness of the determined reducing moment. This can, for example, be achieved through a weighted average value formation or through defined filtering of the reducing moments.

Alternatively, or in addition, on the basis of the electrical current i, a support of the mathematical model 20 can be achieved, in particular that of the part of the mathematical model 20 modeling the hysteresis of the gearbox 12 through the values of the electrical current i of the motor 11. A hysteresis model thus usually works with connecting characteristics, which for example approximate the friction behavior of the gearbox 12. The electrical current i of the motor 11 also indirectly captures the friction behavior. This can be used in that some occurrences of the hysteresis model can be implemented on the basis of the electrical current i in the sense of a "referencing to the electrical current i".

The invention claimed is:

1. A method for determining with a controller of a robotic manipulator a torque having an effect on a link of a robotic arm, whereby the robotic arm has several sequentially arranged links, of which a first link is supported relative to a second link of the links on an axis of rotation, and by use of a stationary motor relative to the second link and a gearbox then connected to the motor, is rotatable around the axis of rotation, the method comprising:
- determining the angle of rotation turned toward the driving side of the motor and the angle of rotation turned to the reducing side of the gearbox, and
- determining the torque having an effect on the first link on the basis of the determined driving side and reducing side angles of rotation of the gearbox and based on a mathematical model of the gearbox, wherein the mathematical model takes into account at least one of:
  - the elastic properties of the gearbox,
  - a hysteresis that depends on the direction of rotation of the gearbox,
  - a rotational direction of the gearbox,
  - a transmission error of a gearbox unit,
  - a speed of rotation of the motor,
  - a deformation of the gearbox dependent on the load, or
  - an increasing and decreasing deformation of the gearbox.

2. The method according to claim 1, in which the gearbox for transmission of the gears has a driving side shaft connected with the motor, a reducing side shaft connected at least indirectly with the first link and has a gearbox unit for a transmission of the gears set up between at least one of the two shafts of the gearbox, whereby the driving side angle of rotation is the angle of rotation of the driving side shaft, and the reducing side angle of rotation is the angle of rotation of the reducing side shaft.

3. The method according to claim 1, having a determination of the driving side angle of rotation by determining the angle of rotation of the motor.

4. The method according to claim 1, in which the torque is calculated by the following formula:

$$\tau(t)=f(\phi_B-\phi_A)$$

wherein:
- T is the torque having an effect on the first link,
- $\phi_A$ is the angle of rotation turned toward the driving side,
- $\phi_B$ is the angle of rotation turned toward the reducing side, and
- $f(\phi_B-\phi_A)$ is stored as the mathematical model as a function of $\phi_B$ and $\phi_A$.

5. The method according to claim 1, in which the motor is an electric motor and has the following method steps:
- determination of an electrical current of the electric motor, and
- at least indirect modification of the torque having an effect on the first link on the basis of the determined driving side and reducing side angles of rotation of the gearbox, and based on the mathematical model of the gearbox based on the determined electrical current.

6. The method according to claim 5, having the following additional procedural steps:
- determination of another torque based on the determined electrical current in a model of the electric motor, and
- fusing of the torque and of the additional torque in order to obtain the resulting torque having an effect on the first link.

7. The method according to claim 5, comprising the use of the electrical current for the support of the mathematical model.

8. An industrial robot, having
- a robotic arm, which has several sequentially arranged links of which a first link is supported relative to a second link relative to the axis of rotation, and using a stationary motor relative to the second link and a gearbox then connected to the motor, and rotatable around the axis of rotation,
- a first angle measuring device, which is set up to determine the driving side angle of rotation turned to the motor of the gearbox,
- a second angle measuring device, which is set up to determine the reducing side angle of rotation turned to the motor of the gearbox, and
- a control device connected with both measuring devices, which is set up to control the motor in the operation of the industrial robot, in which a mathematical model of the gearbox is stored, which considers in particular the elastic properties of the gearbox, and which is set up to determine the torque having an effect on the first link on the basis of the determined driving side and reducing side angles of rotation of the gearbox, and based on the mathematical model in accordance with the method of claim 1.

9. The industrial robot according to claim 8, in which the first measuring device is configured to determine the angle of rotation of a shaft of the motor, in order to determine the driving side angle of rotation.

* * * * *